(12) United States Patent
Gessaman et al.

(10) Patent No.: US 7,426,936 B2
(45) Date of Patent: Sep. 23, 2008

(54) FULLY INDEPENDENT, REDUNDANT FLUID ENERGIZED SEALING SOLUTION WITH SECONDARY CONTAINMENT

(75) Inventors: Jeff A Gessaman, Fort Collins, CO (US); Steven Charles Stumbo, Fort Collins, CO (US); Kevin E. Greeb, Fort Collins, CO (US); Wade A. Burdick, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 0 days.

(21) Appl. No.: 11/366,299

(22) Filed: Mar. 2, 2006

(65) Prior Publication Data

US 2007/0120085 A1 May 31, 2007

Related U.S. Application Data

(63) Continuation-in-part of application No. 11/288,756, filed on Nov. 29, 2005, now abandoned.

(51) Int. Cl.
*F16J 9/00* (2006.01)
(52) U.S. Cl. .................. 137/312; 251/214; 277/320
(58) Field of Classification Search .......... 251/214; 277/320; 137/312
See application file for complete search history.

(56) References Cited

U.S. PATENT DOCUMENTS

| | | | |
|---|---|---|---|
| 1,593,533 A | 7/1926 | Joyce | |
| 1,636,752 A | 4/1927 | Mitchell | |
| 1,721,737 A | 7/1929 | Joyce | |
| 1,779,938 A | 10/1930 | Joyce | |
| 1,835,887 A | 12/1931 | Mackey | |

(Continued)

FOREIGN PATENT DOCUMENTS

EP     0308390     3/1989

(Continued)

OTHER PUBLICATIONS

U.S. Appl. No. 60/096,877, filed Aug. 17, 1998, Arbuckle.

(Continued)

*Primary Examiner*—Stephen M. Hepperle
*Assistant Examiner*—Andrew J Rost
(74) *Attorney, Agent, or Firm*—Reinhart Boerner Van Deuren P.C.

(57) ABSTRACT

A redundant sealing system with secondary containment for preventing leakage of fluid along a valve shaft is provided. The system comprises a first set of dynamic seals, a second set of dynamic seals, an auxiliary barrier fluid chamber, and a barrier fluid indicator. The first and second set of dynamic seals are in spaced relation to each other a distance equal to or further than a maximum stroke length of an actuatable valve stem. The auxiliary barrier fluid chamber is interposed between the first and second sets of dynamic seals. The barrier fluid indicator has a piston in a primary barrier fluid chamber. A first face of the piston is exposed to the auxiliary barrier fluid chamber. A second face of the piston is exposed to a barrier fluid and inhibited from fluid communication with the auxiliary barrier fluid chamber by a dynamic seal in the first set of dynamic seals.

19 Claims, 4 Drawing Sheets

U.S. PATENT DOCUMENTS

| | | | |
|---|---|---|---|
| 2,427,656 | A | 9/1947 | Blom |
| 3,176,996 | A | 4/1965 | Barnett |
| 3,297,329 | A | 1/1967 | Smith et al. |
| 3,334,906 | A | 8/1967 | Arnold |
| 3,589,737 | A | 6/1971 | Sedy |
| 3,648,718 | A | 3/1972 | Curran |
| 3,770,247 | A | 11/1973 | Nelson |
| 3,774,877 | A | 11/1973 | Robertson |
| 3,830,306 | A | 8/1974 | Brown |
| 3,869,131 | A | 3/1975 | Derner |
| 3,887,195 | A | 6/1975 | Vinciguerra |
| 3,954,348 | A | 5/1976 | Renaud |
| 3,955,822 | A | 5/1976 | Irby |
| 3,958,592 | A | 5/1976 | Wells |
| 4,222,575 | A | 9/1980 | Sekiguchi et al. |
| 4,289,445 | A | 9/1981 | Sims |
| 4,290,611 | A | 9/1981 | Sedy |
| 4,295,653 | A | 10/1981 | Coles |
| 4,354,664 | A | 10/1982 | Taylor et al. |
| 4,384,820 | A | 5/1983 | Sims |
| 4,475,735 | A | 10/1984 | Smuda et al. |
| 4,483,141 | A | 11/1984 | Kobayashi et al. |
| 4,505,115 | A | 3/1985 | Arbuckle |
| 4,509,897 | A | 4/1985 | Sims |
| 4,552,369 | A * | 11/1985 | Stewart et al. ............ 277/513 |
| 4,623,151 | A | 11/1986 | Kashiwamura et al. |
| 4,702,269 | A | 10/1987 | Schuler |
| 4,819,948 | A | 4/1989 | Merrifield |
| 4,858,937 | A | 8/1989 | Fairlie-Clarke et al. |
| 4,915,579 | A | 4/1990 | Whittier et al. |
| 4,922,719 | A | 5/1990 | Arbuckle |
| 4,960,039 | A | 10/1990 | Robertson |
| 5,052,720 | A | 10/1991 | Yoda |
| 5,170,659 | A * | 12/1992 | Kemp ............................ 73/46 |
| 5,178,363 | A | 1/1993 | Icenhower et al. |
| 5,203,370 | A | 4/1993 | Block et al. |
| 5,209,495 | A | 5/1993 | Palmour |
| 5,211,532 | A | 5/1993 | Thompson |
| 5,244,183 | A | 9/1993 | Calvin et al. |
| 5,305,854 | A | 4/1994 | Wheeler |
| 5,412,977 | A | 5/1995 | Schmohl et al. |
| 5,474,307 | A | 12/1995 | DeBiasse et al. |
| 5,519,295 | A | 5/1996 | Jatnieks |
| 5,562,406 | A | 10/1996 | Ooka et al. |
| 5,607,165 | A | 3/1997 | Bredemeyer |
| 5,636,847 | A | 6/1997 | Ostrowski |
| 5,643,026 | A | 7/1997 | Pietsch et al. |
| 5,676,382 | A | 10/1997 | Dahlheimer |
| 5,746,435 | A | 5/1998 | Arbuckle |
| 5,772,216 | A | 6/1998 | Bredemeyer |
| 5,823,541 | A | 10/1998 | Dietle et al. |
| 5,906,374 | A | 5/1999 | Arbuckle |
| 5,921,554 | A | 7/1999 | Derian et al. |
| 6,062,570 | A * | 5/2000 | Erickson ..................... 277/529 |
| 6,161,835 | A | 12/2000 | Arbuckle |
| 6,161,838 | A | 12/2000 | Balsells |
| 6,162,031 | A | 12/2000 | Tremoulet, Jr. |
| 6,210,107 | B1 | 4/2001 | Volden et al. |
| 2004/0134665 | A1 | 7/2004 | Greeb |

FOREIGN PATENT DOCUMENTS

| | | |
|---|---|---|
| EP | 0499745 | 8/1992 |
| EP | 1012081 | 10/2001 |
| EP | 1231418 | 8/2002 |
| EP | 1239197 | 9/2002 |
| JP | 57116974 A2 | 7/1982 |
| JP | 5001776 A2 | 1/1993 |
| JP | 5106746 A2 | 4/1993 |
| WO | WO 96/10707 | 4/1996 |
| WO | WO 97/13713 | 4/1997 |
| WO | WO 97/34095 | 9/1997 |
| WO | WO 03/021142 | 3/2003 |

OTHER PUBLICATIONS

U.S. Appl. No. 60/096,738, filed Aug. 17, 1998, Arbuckle.
U.S. Appl. No. 10/440,507, filed May 15, 2003, Burdick et al.
U.S. Appl. No. 10/715, 708, filed Nov. 18, 2003, Greeb et al.

* cited by examiner

FULLY INDEPENDENT, REDUNDANT FLUID ENERGIZED SEALING SOLUTION WITH SECONDARY CONTAINMENT

CROSS-REFERENCE TO RELATED PATENT APPLICATIONS

This patent application is a continuation-in-part of copending U.S. patent application Ser. No. 11/288,756, filed Nov. 29, 2005.

FIELD OF THE INVENTION

The present invention relates generally to seals and sealing, and more particularly to pressurized seals for sealing a reciprocating stem or shaft. The present invention finds particular utility in valves that regulate a process fluid where leakage of that process fluid is to be minimized.

BACKGROUND OF THE INVENTION

Flow regulating valves are devices that can be adjusted to restrict or increase the flow of a fluid through a conduit. Such valves are generally well known in the art and have many practical applications. For example, in the commercial natural gas production industry, flow-regulating valves are commonly used to vary the flow of natural gas through a network of gas collection pipes. The network of collection pipes will often connect and branch together tens to hundreds of natural gas ground wells in a localized geographic region. The individual wells will feed natural gas through the network of gas collection pipes to a common output location. Often, the desired natural gas output is less than the maximum production capacity of the several wells combined. Such demands can change due to cyclical seasonal trends and for other economic reasons. This creates a need for regulating and monitoring natural gas production from each well to control the supply.

A branch collection pipe for each individual well typically includes a flow-regulating valve and a gas flow sensor arranged in fluid series to regulate the production output of each individual well. The gas flow sensor indicates the amount of natural gas that flows through the collection pipe. The regulating control valve provides a variable degree of opening that forms a restriction orifice in the collection pipe and thereby sets the natural gas flow rate in the collection pipe.

The flow-regulating valve is typically a movable/positionable type of valve such as a linearly translatable valve. A valve of this design generally includes a valve body through which a flow passage is disposed. Other components include a plug member located within the flow passage and an elongated valve stem. The plug member is attached to the valve stem and the valve stem passes through a valve bonnet. Using the valve stem, the plug member can be linearly translated toward or away from a valve seat within the flow passage between a fully opened position and a fully closed position, and intermediate positions therebetween. The plug member blocks all flow when in the fully closed position and allows for maximum flow when in the fully opened position.

An actuator is often connected to the valve stem to linearly translate the plug member towards and away from the valve seat,. The actuator is typically located adjacent the valve bonnet and imparts linear translation motion to the valve stem. Accordingly, the valve stem will have to move with respect to the valve housing that it passes into. To prevent the undesirable loss of process fluids passing through the valve, the intersection between the reciprocating valve stem and the valve bonnet into which the stem passes should be well sealed. This is especially true where the process fluid is flammable and capable of potentially producing an explosion (e.g., natural gas, gaseous fuel), is poisonous, or is otherwise environmentally harmful.

Several devices and sealing methods have been proposed for sealing a linearly moving valve stem in a pressurized seal arrangement as disclosed in, for example, U.S. Pat. Nos. 6,161,835 and 5,746,435 to Arbuckle, U.S. Pat. Nos. 5,772,216 and 5,607,165 to Bredemeyer, and U.S. Pub. Applns. 2004/0135112 and 2004/0134665 to Greeb, et al., each of which is incorporated herein in its entirety by this reference. Such pressurized dynamic sealing arrangements may be used in the process gas industry for valves and the like to promote sealing and ensure that the process gas does not leak or produce a hazardous external environment. These patents disclose that using a pressurized barrier fluid or sealant (e.g., grease) provides opposing axial fluid forces on two spaced apart seals. In these arrangements, the barrier fluid has a pressure that is typically greater than a pressure of the process fluid. As such, if leakage is to occur, most or all of the leakage would be the barrier fluid rather than the process fluid since the barrier fluid is at the higher pressure of the two. Indicating mechanisms, which are disclosed in the above-noted patents, effectively indicate and inform a user whether leakage of the barrier fluid is occurring.

Unfortunately, the concepts disclosed in the Arbuckle and Bredemeyer patents are complex and costly to implement, have complex plumbing arrangements, are not practical to structurally implement, and/or require numerous complex components for establishing a preload barrier. Further, the indicating mechanism or indicators disclosed in at least some of these patents may have accuracy problems, may not readily indicate the exact source of the problem, and/or may be difficult or impractical to employ in the field or across different applications. Finally, these prior art concepts disclosed in the Arbuckle and Bredemeyer patents are subject to potential premature failure and leakage since they do not provide fully independent redundant seals in the sealing arrangements as well as an auxiliary (i.e., secondary) containment chamber to impound a leaking barrier fluid.

BRIEF SUMMARY OF THE INVENTION

The invention provides a sealing system that solves the aforementioned shortcomings and other problems. These and other advantages, as well as additional inventive features will be apparent from the description provided herein.

In one aspect, a stem sealing system for preventing leakage of a fluid in a valve housing having a movable stem is provided. The stem sealing system comprises a first set of dynamic seals, a second set of dynamic seals, an auxiliary barrier fluid chamber, and a barrier fluid indicator. The first set of dynamic seals engage the stem. The second set of dynamic seals also engage the stem and are in spaced relation to the first set of dynamic seals. The auxiliary barrier fluid chamber surrounds the shaft and is interposed between the first and second sets of dynamic seals. The barrier fluid indicator has a load member in a primary barrier fluid chamber. A first face of the load member is exposed to the auxiliary barrier fluid chamber and a second face of the load member exposed to a barrier fluid contained between two seals in the first set of dynamic seals and inhibited from fluid communication with the auxiliary barrier fluid chamber by a dynamic seal in the first set of dynamic seals. The load member is adapted to pressurize the barrier fluid.

In another aspect, a valve bonnet in a valve is provided. The valve bonnet comprises a bore, a first set of dynamic seals, a second set of dynamic seals, and a barrier fluid indicator. The bore is adapted to receive an actuatable valve stem and forms an auxiliary barrier fluid chamber. The auxiliary barrier fluid chamber surrounds the actuatable valve stem. The first set of dynamic seals engages the actuatable valve stem and includes a first dynamic seal. The second set of dynamic seals engages the actuatable valve stem. The first and second sets of dynamic seals are in spaced relation to each other and on opposing sides of the auxiliary barrier fluid chamber. The spaced relation is greater than a maximum stroke length of the actuatable valve stem. The barrier fluid indicator has a load member in a primary barrier fluid chamber. A first face of the load member is exposed to a the auxiliary barrier fluid chamber while a second face of the load member is exposed to a barrier fluid and inhibited from fluid communication with the auxiliary barrier fluid chamber by the first dynamic seal. The load member is adapted to pressurize the barrier fluid.

In yet another aspect, a valve is provided. The valve comprises a valve body, a first redundant sealing system, a second redundant sealing system, and a barrier fluid indicator. The valve body has a flow passage and a bore adapted to receive a translatable valve member. The translatable valve member is adapted to regulate a flow of a process fluid through the flow passage. The bore forms an auxiliary barrier fluid chamber. The first redundant sealing system is sealingly interposed between the valve body and the translatable valve member. The second redundant sealing system is sealingly interposed between the valve body and the translatable valve member. The second redundant sealing system is in spaced relation to the first redundant sealing system. The first and second redundant sealing systems are spaced apart at least a maximum stroke length of the translatable valve member. The auxiliary barrier fluid chamber is interposed between the first and second redundant sealing systems. The barrier fluid indicator has a load member in a primary barrier fluid chamber containing a pressurizable barrier fluid. A first face of the load member is exposed to the auxiliary barrier fluid chamber while a second face of the load member is exposed to the barrier fluid and in fluid communication with the bore and the translatable valve member. A lower dynamic seal in the first redundant sealing system inhibits fluid communication between the first face of the load member and the auxiliary barrier fluid chamber.

Other aspects and advantages will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

DETAILED DESCRIPTION OF THE INVENTION

Figure 1:
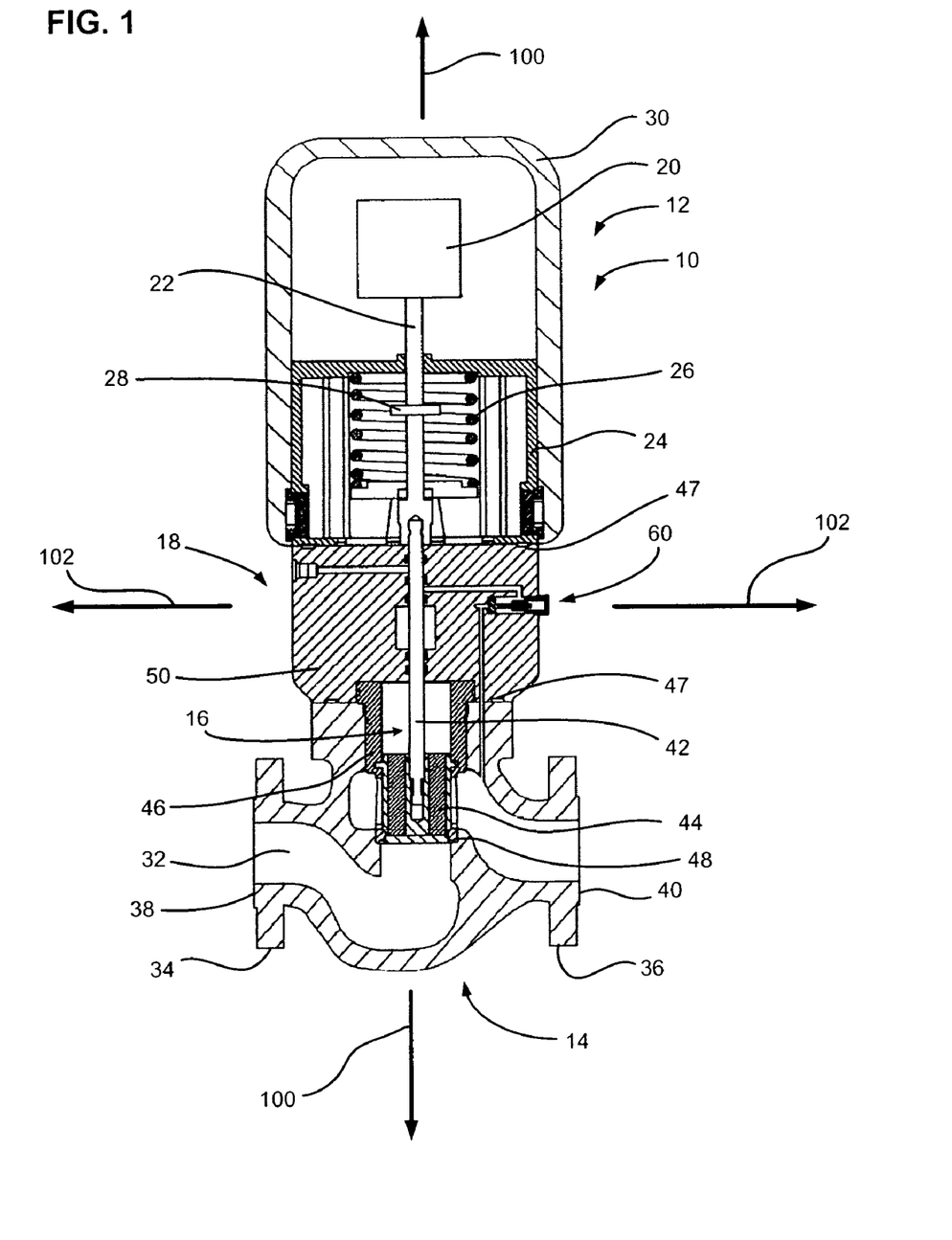
FIG. 1 is a cross sectional view of an operating environment in which the teachings of the present invention may be implemented.

Turning to the drawings, wherein like reference numerals refer to like elements, t a redundant sealing system with secondary containment for preventing leakage of fluid along a valve shaft is shown. Referring to FIG. 1, a valve 10 that includes redundant fluid energized dynamic seals and an auxiliary chamber for barrier fluid is illustrated. As will be more fully explained below, the fully independent redundant sealing of the invention advantageously provides a higher level of reliability. Additionally, the auxiliary chamber for barrier fluid reduces the potential for leaks and lessens the chance that barrier fluid will blend or commingle with process fluid.

As illustrated in FIG. 1, the valve 10 comprises an actuator 12, a valve body 14, a translatable member 16, and a valve bonnet 18. While the valve 10 may be a linearly translatable valve, a rotary valve, or other movable/positionable valves as known in the art, the well head valve depicted in FIG. 1 is a linearly translatable type of valve and shall be used to describe the invention. Prior to describing the invention in detail, the operation of the valve shall be explained to aid in the understanding of the invention.

The actuator 12, which can be electrical in nature, generally includes such components as a gear box 20, an actuator stem 22, a spring housing 24, a spring 26, and a support structure 28. The gear box 20 is coupled to, and provides translational movement to, the actuator stem 22. The actuator stem 22 passes into the spring housing 24 that is confining and guiding the spring 26. In one embodiment, the spring 26 includes thereon a support structure 28 that permits a reversal of the spring activation force. Each of these components is generally reside within an actuator housing 30. Depending on the particular use of the valve 10, and the various different types of actuators well known in the art, the actuator 12 can include a plethora of various other components and features.

The valve body 14 defines a flow passage 32 that extends between and through mounting flanges 34, 36 on, in the illustrated embodiment, opposing ends 38, 40 of the valve body 14. Even so, other flow passages having different configurations may be used. The mounting flanges 34, 36 are adapted to couple and/or mount the valve 10 to a collection pipe (not shown) that is configured to transport, for example, a process fluid such as, for example, natural gas, gaseous fluid, and the like.

Still referring to FIG. 1, the translatable valve member 16 includes an elongate valve stem 42 and a plug 44. The valve stem 42 generally extends through the valve bonnet 18 and the valve body 14. The valve stem 42 is coupled at one end to the plug 44 and at another end to the actuator stem 22. As such, the valve and actuator stems 42, 22 can transmit the selective positioning force from the actuator 12 to the plug 44.

The plug 44 is situated in and guided by a metering cage 46 in the valve body 14. The metering cage 46 radially restrains and guides movement of the plug 44. The plug 44 and the metering cage 46 are situated along the flow passage 32 to provide and/or form a restriction orifice that regulates flow of the process fluid through the flow passage 32 in the valve body 14. Courtesy of the actuator 12, the plug 44 is linearly translatable toward and away from a valve seat 48 in and on the valve body 14. As such, the plug 44 can be manipulated between fully closed and fully open positions, as well as intermediate positions therebetween. The plug 44 blocks all flow when in the fully closed position and allows for maximum flow when in the fully open position.

To provide for installation of the translatable valve member 16, the valve body 14 and valve bonnet 18 may be composed of multiple pieces and/or components. In such cases, one or more static seals 47 can be situated between the valve body 14 and valve bonnet 18. Also, since the valve bonnet is generally interposed and/or "sandwiched" between the actuator 12 and the valve body 14, one or more static seals 47 can be placed between the valve bonnet 18 and the actuator 12 as well. In one embodiment, the valve body 14 and the valve bonnet 18 can be integrally formed together. The valve bonnet 18 generally provides a leak proof closure for the valve body 14. In other words, the valve bonnet 18 acts like a "hood" for the valve body 14.

Figure 2:
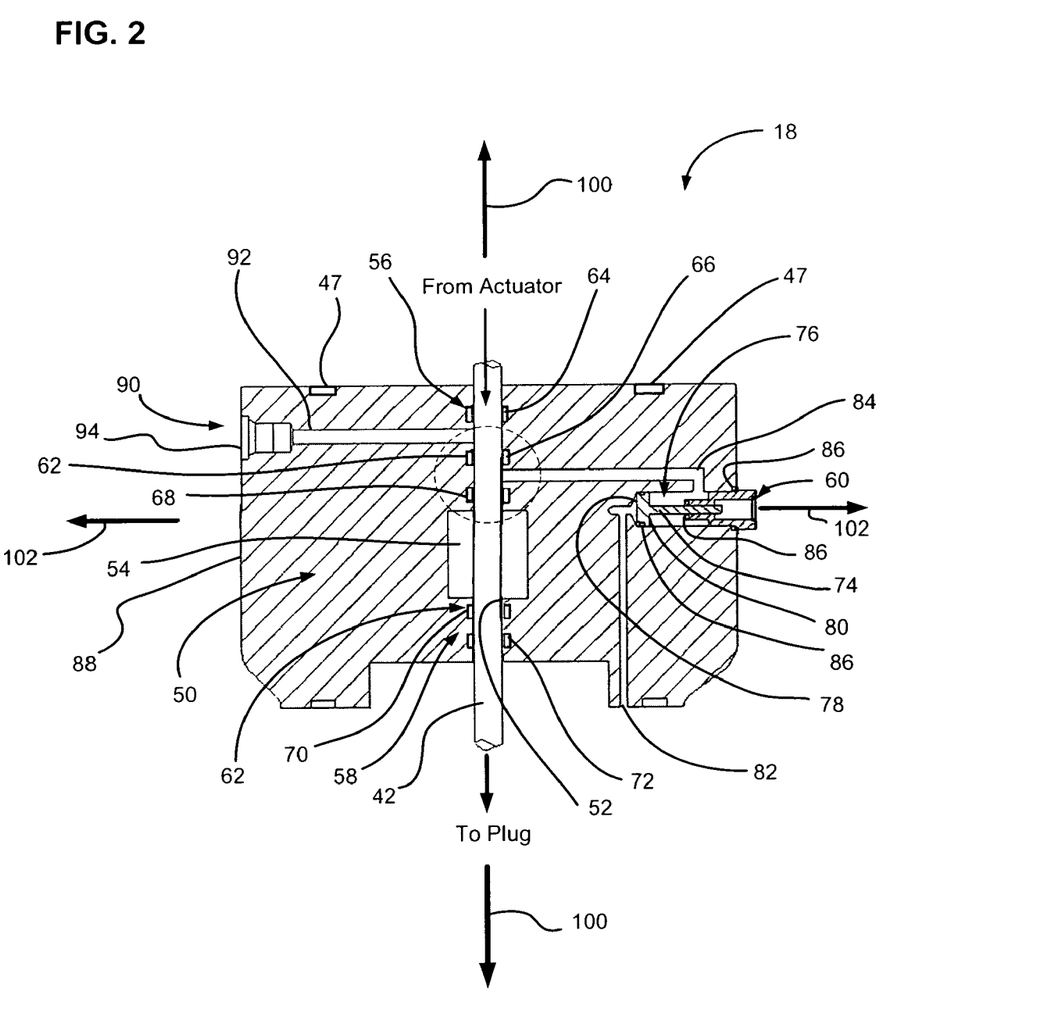
FIG. 2 is a bonnet from the valve of FIG. 1 illustrating an auxiliary barrier fluid chamber and fully independent redundant dynamic seals in accordance with the teachings of the invention.

Now that an operating environment has been described, the invention as implemented in the valve bonnet 18 shall now be described. Referring to FIGS. 1 and 2, the valve bonnet 18 comprises a valve bonnet body 50, a bore 52 or passage forming an auxiliary (or secondary) barrier fluid chamber 54 or reservoir, a first set of dynamic seals 56, a second set of dynamic seals 58, and a barrier fluid indicator 60.

The bore 52 generally extends entirely through the valve bonnet body 50. Further, the bore 52 is dimensioned and configured to permit the valve stem 42 of the translatable member 16 to be translatably and/or rotatably received therein. The bore 52 includes notches 62 dispersed along a bore length that are adapted to receive and accommodate a dynamic (i.e., a fluid energized) seal such as, for example, a cup seal, a wiper seal, and the like. The notches 62 can also receive snap rings, washers, spacers, and the like, to position and/or secure the dynamic seals as well known in the art.

Figure 3:
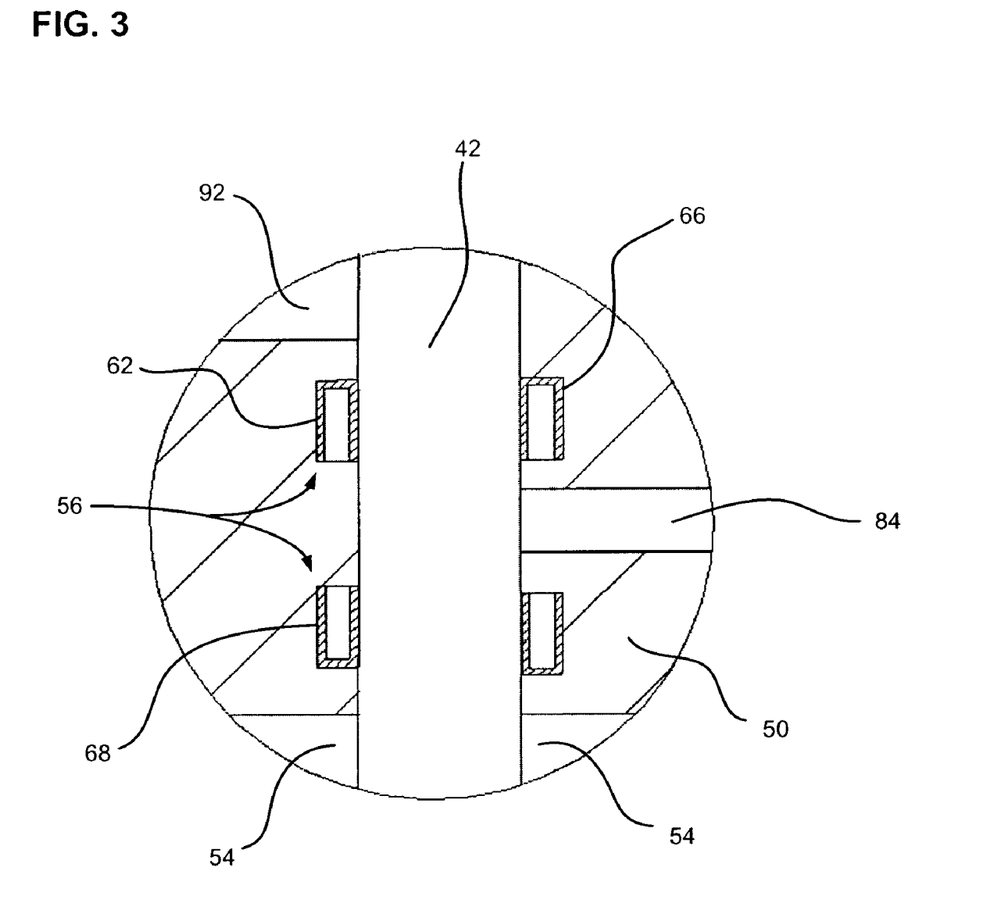
FIG. 3 is an enlarged view of a portion of FIG. 2 highlighting one type of dynamic seal known as a cup seal.

In the illustrated embodiment of FIG. 2, the first set of dynamic seals 56 includes a top dynamic seal 64, a middle dynamic seal 66, and a lower dynamic seal 68. Each of the seals 64, 66, 68, is an annular seal that encircles and/or surrounds the valve stem 42. The seals 64, 66, 68, as shown in FIG. 2, are interposed between the valve bonnet body 50 and the valve stem 42 and are arranged in fluidic series. As illustrated in FIG. 3, the seals in the illustrated embodiment (e.g., 66, 68) form a "cup" that is adapted to catch a pressurized fluid. The legs of the cup are biased outwardly away from each other and against the valve bonnet body 50 and the valve stem 42 to inhibit and/or prevent the pressurized fluid from passing the seal. As depicted in FIG. 2, the open end of the cup in the top and middle dynamic seals 64, 66 faces toward the auxiliary barrier fluid chamber 54 and away from the actuator 12. In contrast, the open end of the cup in the lower dynamic seal 68 is directed away from the auxiliary barrier fluid chamber 54 and toward the actuator 12. Such an arrangement of dynamic seals provides an exemplary level of redundancy and gives the valve bonnet 18 and/or the valve 10 high reliability.

Again, in the illustrated embodiment, the second set of dynamic seals 58 includes an upper dynamic seal 70 and a bottom dynamic seal 72. Again, each of the dynamic seals 70, 72 is an annular seal that encircles and/or surrounds all or a portion of the valve stem 42. The seals 70, 72, as shown in FIG. 2, are interposed between the valve bonnet body 50 and the valve stem 42 and are arranged in fluidic series. The seals 70, 72 form a "cup" that is adapted to catch a pressurized fluid. Like above, the legs of the cup seals are biased outwardly and away from each other and inhibit and/or prevent the pressurized fluid from passing the seal. As depicted in FIG. 2, the open end of the cup in the upper dynamic seal 70 is directed toward the auxiliary barrier fluid chamber 54 and away from the plug 44. In contrast, the open end of the cup in the bottom dynamic seal 72 is directed away from the auxiliary barrier fluid chamber 54 and toward the plug 44. In one embodiment, the upper and bottom dynamic seals 70, 72 can be combined such that they form a single bi-directional seal. Again, such dynamic seals provide an exemplary level of redundancy and give the valve bonnet 18 and/or the valve 10 higher reliability.

As depicted in FIG. 2, the first and second sets of dynamic seals 56, 58, are in spaced relation to each other and generally disposed on opposing sides of the auxiliary barrier fluid chamber 54. In a preferred embodiment, the first and second sets of dynamic seals 56, 58, and in particular the lower seal 68 and the upper seal 70, are most proximate the auxiliary barrier fluid chamber 54 and spaced apart a distance equal to or greater than a maximum stroke length of the valve stem 42. Such an arrangement inhibits and/or prevents wear to the valve stem 42, the bore 52, and/or the sets of dynamic seals 56, 58. Additionally, the spacing of the independent dynamic seals 64, 66, 68, 70, 72 prevents the failure of one seal from causing the failure of one or more of the other seals.

While the first set of dynamic seals 56 is illustrated as including three dynamic seals 64, 66, 68 and the second set of dynamic seals 58 is illustrated as having two dynamic seals 70, 72, additional dynamic seals can be included to provide even more redundancy.

In the illustrated embodiment, the auxiliary barrier fluid chamber 54 is formed by providing a portion of the bore 52 with a greater diameter. As such, the auxiliary barrier fluid chamber 54 is adapted to receive a barrier fluid upon the failure of lower dynamic seal 68. During normal operation, and when the lower dynamic seal 68 is intact, the auxiliary barrier fluid chamber 54 is preferably predominantly free of barrier fluid. A small amount of the barrier fluid may seep around the lower dynamic seal 68 and into the auxiliary barrier fluid chamber 54 during typical operation without catastrophic and/or harmful effect. The auxiliary barrier fluid chamber 54 is most suited and provided to capture an excessive and/or large amount of the barrier fluid should the lower dynamic seal 68 suffer a total and/or substantial failure.

The barrier fluid indicator 60 includes a load member, illustrated as a piston 74, disposed in a primary barrier fluid chamber 76 or reservoir. The piston 74 has a first face 78 and a second face 80. The first face 78 is exposed to, and in fluid communication with, a process fluid such as, for example, the process fluid that flows or resides in the flow passage 32 (FIG. 1) of the valve body 14. In the illustrated embodiment, the first face 78 is exposed to the process fluid via a process fluid channel 82 that passes through the valve bonnet body 50.

The second face 80 of the piston 74 is exposed to a barrier fluid and is, via barrier fluid channel 84, in fluid communication with a portion of the valve stem 42. The barrier fluid channel 84 preferably terminates between the middle and lower dynamic seals 66, 68. As such, the barrier fluid within the primary barrier fluid chamber 76 is pressurized and able to adequately lubricate the translating valve stem 42. As shown in FIGS. 1 and 2, in the illustrated embodiment, the valve stem 42 moves along a first axis 100 and the piston 74 (i.e., load member) moves along a second axis 102. Notably, the two axes 100, 102 are approximately perpendicular, which is meant to include exactly perpendicular, to each other. In addition, to guard against leakage of the barrier fluid, the barrier fluid indicator 60 can include one or more static and/or dynamic indicator seals 86.

Since the barrier fluid in the primary barrier fluid chamber 76 is typically at a pressure that is higher than a pressure of the process fluid flowing through or residing in the flow passage 32 in the valve body 14 (FIG. 1), the piston 74 is biased against the valve bonnet body 50 toward the valve stem 42 as shown in FIG. 2. If the pressure of the barrier fluid drops, the pressure of the process fluid will eventually begin to exceed the pressure of the barrier fluid. This causes the piston 74 of the indicator 60 to move away from the valve stem 42. In this manner, the barrier fluid indicator 60 is capable of visually notifying a user of the well head 10 about the status of the barrier fluid. The status of the barrier fluid can, by inference, reveal that there is a problem with the integrity of one or more of the seals 64, 66, 68, 70, 72, that the auxiliary barrier fluid chamber 54 has been called upon, that the process fluid pressure has dangerously increased, and the like. To make the barrier fluid indicator 60 easy to see and read, a portion of the indicator can be visible through, or protruding from, a sidewall 88 of the valve bonnet 18.

In the illustrated embodiment, a failure of the lower dynamic seal 68 causes the barrier fluid from the primary barrier fluid 76 to spill and/or creep into the auxiliary barrier fluid chamber 60. A failure of the middle dynamic seal 66 immediately enlists the top dynamic seal 64 to contain the barrier fluid. For the barrier fluid to get to the flow passage 32 and commingle with the process fluid, the auxiliary barrier fluid chamber 54 would have to fill and each of the upper and bottom dynamic seals 70, 72 would have to fail. Therefore, the valve bonnet 18, with its first and second sets of dynamic seals 56, 58 arranged in fluidic series and its auxiliary barrier fluid chamber 54, provides an exemplary level of redundancy. The seals 64, 66, 68, 70, 72 and/or the auxiliary barrier fluid chamber 54 redundantly ensure that the barrier fluid and the process fluid remain isolated from each other and do not end up mixing together. In other words, the process fluid is protected from contamination by the barrier fluid.

As shown in FIG. 2, in one embodiment the valve bonnet 18 includes a vent 90. The vent 90 is in fluid communication with the bore 52 via a vent channel 92 passing through the valve bonnet body 50. In a preferred embodiment, the vent channel 92 terminates between the top and middle dynamic seals 64, 66. In one embodiment, the vent 90 has an outlet 94 formed in the sidewall 88 of the valve bonnet 18.

The vent 90 can be used for a number of purposes depending upon the particular application of the valve 10. The vent 90 can be connected to some form of instrumentation such as, for example, a barrier fluid sensor (not shown). In such cases, the sensor is adapted to detect leakage of the barrier fluid, a change in barrier fluid pressure, and the like. This additional feature provides a safeguard in the event that the barrier fluid indicator 60 has malfunctioned, the barrier fluid indicator is not visible, that one or more channels 82, 84 are plugged, and the like.

Figure 4:
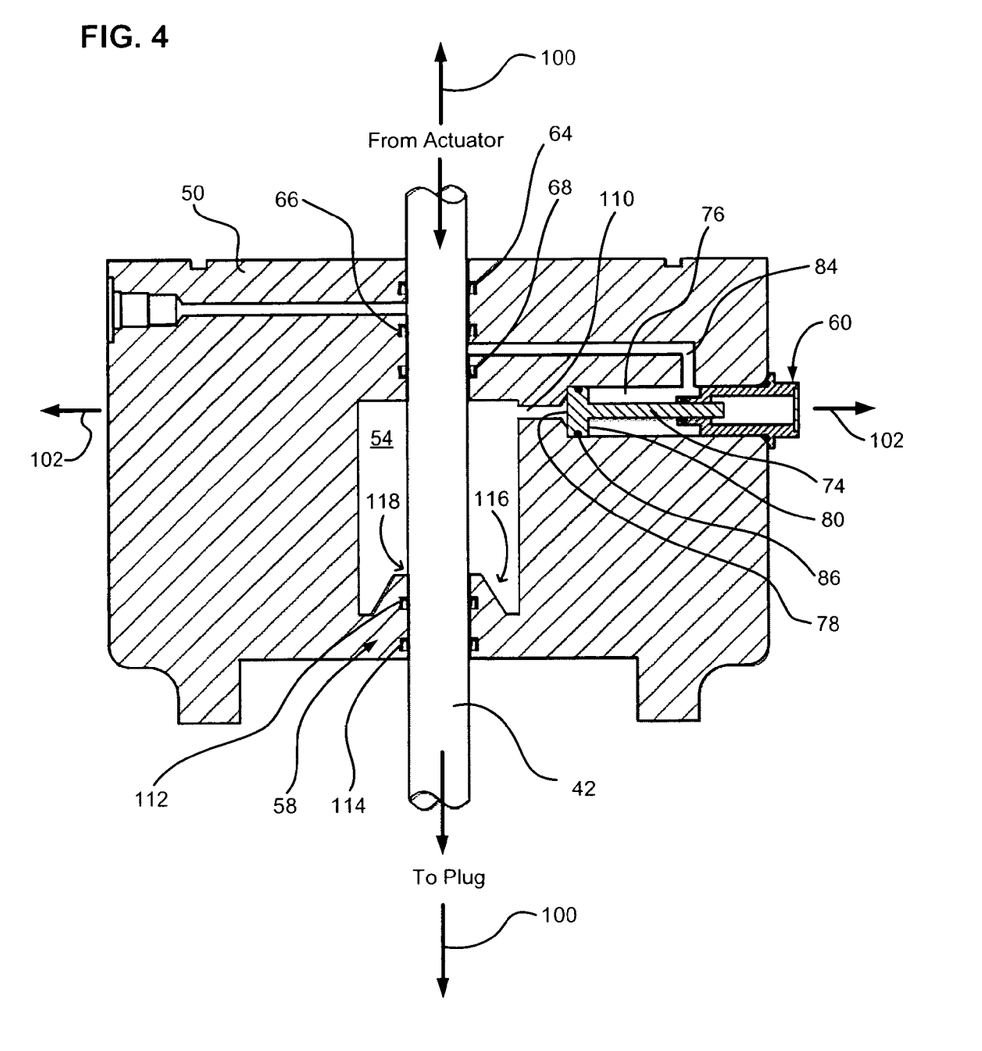
FIG. 4 is a bonnet from the valve of FIG. 1 illustrating an alternate embodiment of an auxiliary barrier fluid chamber and fully independent redundant dynamic seals in accordance with the teachings of the invention While the invention will be described in connection with certain embodiments, there is no intent to limit it to those embodiments. On the contrary, the intent is to cover all alternatives, modifications and equivalents as included within the spirit and scope of the invention as defined by the appended claims.

There are some applications where it is important that the barrier fluid be prevented from leaking into the process fluid. As such, the process fluid channel 82 provides a potential path for the barrier fluid to leak into the process fluid if the seal 86 fails. Turning now to FIG. 4, in an alternate embodiment, the first face 78 of piston 74 is exposed to the auxiliary barrier fluid chamber 54 via channel 110 that passes through the valve bonnet body 50. The second face 80 is exposed to a barrier fluid and is in fluid communication with a portion of the valve stem 42 via barrier fluid channel 84 as in FIG. 2. As a result, the piston 74 is acted upon by the same pressure that is acting on seal 68. Failure of the seal 86 results in the capture of barrier fluid in the auxiliary barrier fluid chamber 54 instead of in the process fluid.

Rather than forming the equivalent of a bi-directional seal in combination, the dynamic seals 112, 114 are uni-directional seals. The use of unidirectional seals prevents high pressure from being trapped in the auxiliary barrier fluid chamber 54 while still preventing barrier fluid from getting into the main process fluid volume. In the embodiment of FIG. 2, the auxiliary barrier fluid chamber pressure lags the process fluid pressure, typically by several hours. This occurs because the seals 70, 72 between the auxiliary barrier fluid chamber and the process fluid will typically leak a very small amount. The seals 70, 72 start to leak due to the differential pressure between the auxiliary barrier fluid chamber and the primary process volume. For example, assume the valve has not been pressurized for many days. The auxiliary barrier fluid chamber and the primary process volume would be at zero psig. When pressure is then applied to the valve, the primary process volume rapidly increases to the system pressure. The leakage continues until the differential pressure is reduced to zero. After the system has been pressurized for example, several days, both volumes will be at system pressure. If system pressure is then decreased, with the use of the bi-directional seals 70, 72, the auxiliary barrier fluid chamber will slowly bleed down over several hours until the pressure in the auxiliary barrier fluid chamber matches the pressure of the primary process volume. With the uni-directional seals 112, 114, the auxiliary barrier fluid chamber will quickly bleed down in a matter of seconds until the pressure in the auxiliary barrier fluid chamber matches the pressure of the primary process volume. While the second set of dynamic seals 58 in this embodiment is illustrated as having two dynamic seals 112, 114, additional dynamic seals can be included to provide even more redundancy.

The bottom surface 116 of the auxiliary barrier fluid chamber 54 is sloped away from the shaft/seal interface 118. Sloping the bottom surface of the auxiliary barrier fluid chamber 54 prevents barrier fluid from pooling around the shaft/seal interface 118. This prevents barrier fluid from being pumped into the main process fluid volume due to repeated pressure cycling after a barrier fluid leak. The slope depends on the consistency of the barrier fluid. As a result, different slopes may be used depending on the application and barrier fluid used.

From the foregoing, it can be seen that a fully independent redundant sealing system that advantageously provides a higher level of reliability has been described. Additionally, the auxiliary barrier fluid chamber reduces the potential for leaks and lessens the chance that barrier fluid will blend or commingle with process fluid.

All references, including publications, patent applications, and patents cited herein are hereby incorporated by reference to the same extent as if each reference were individually and specifically indicated to be incorporated by reference and were set forth in its entirely herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A stem sealing system for preventing leakage of a fluid in a valve housing having a movable stem, the stem sealing system comprising:
   a first set of dynamic seals engaging the stem;
   a second set of dynamic seals, the second set of dynamic seals engaging the stem and in spaced relation to the first set of dynamic seals;
   an auxiliary barrier fluid chamber surrounding the shaft and interposed between the first set of dynamic seals and the second set of dynamic seals, the auxiliary barrier fluid chamber being substantially free of barrier fluid during normal operation; and
   a barrier fluid indicator having a load member in a primary barrier fluid chamber, a first face of the load member exposed to pressure in the auxiliary baffler fluid chamber, a second face of the load member exposed to a barrier fluid contained between two seals in the first set of dynamic seals and inhibited from fluid communication with the auxiliary barrier fluid chamber by a dynamic seal in the first set of dynamic seals, the load member adapted to pressurize the barrier fluid based on the pressure in the auxiliary barrier fluid chamber.

2. The stem sealing system of claim 1 wherein the second set of dynamic seals are uni-directional seals.

3. The stem sealing system of claim 1 wherein the movable stem moves along a first axis and the load member moves along a second axis, the first axis approximately perpendicular to the second axis.

4. The stem sealing system of claim 1 wherein the load member has a seal and the barrier fluid is inhibited from entering the auxiliary barrier fluid chamber while the dynamic seal in the first set of dynamic seals and the seal are intact.

5. The stem sealing system of claim 1 wherein the auxiliary barrier fluid chamber has a bottom surface and a portion of the bottom surface is sloped.

6. The stem sealing system of claim 1 wherein the auxiliary fluid chamber is adapted to at least one of inhibit mixing and prevent mixing of the barrier fluid and the process fluid.

7. The stem sealing system of claim 1 wherein at least a portion of the barrier fluid indicator protrudes from a sidewall of the valve housing.

8. The stem sealing system of claim 1 wherein the load member is a piston.

9. A valve bonnet in a valve, the valve bonnet comprising:
   a bore adapted to receive an actuatable valve stem and forming an auxiliary barrier fluid chamber, the auxiliary barrier fluid chamber surrounding the actuatable valve stem;
   a first set of dynamic seals engaging the actuatable valve stem and including a first dynamic seal;
   a second set of dynamic seals engaging the actuatable valve stem, the first set of dynamic seals and the second sets of dynamic seals in spaced relation to each other and on opposing sides of the auxiliary barrier fluid chamber, the auxiliary barrier fluid chamber being substantially free of barrier fluid during normal operation, the spaced relation greater than a maximum stroke length of the actuatable valve stem; and
   a barrier fluid indicator having a load member in a primary barrier fluid chamber, a first face of the load member exposed to the auxiliary baffler fluid chamber, a second face of the load member exposed to a barrier fluid and inhibited from fluid communication with the auxiliary barrier fluid chamber by a seal in the first set of dynamic seals, the load member adapted to pressurize the barrier fluid from a pressure of the auxiliary barrier fluid chamber.

10. The valve bonnet of claim 9 wherein failure of the seal in the first set of dynamic seals places the auxiliary barrier fluid chamber and the primary fluid chamber in fluid communication.

11. The valve bonnet of claim 9 wherein the load member has a seal and the primary barrier fluid chamber is occupied by the barrier fluid and the barrier fluid is inhibited from entering the barrier fluid auxiliary chamber while the integrity of the seal in the first set of dynamic seals and the integrity of the seal are maintained.

12. The valve bonnet of claim 9 wherein the auxiliary barrier fluid chamber has a bottom surface and a portion of the bottom surface is sloped.

13. The valve bonnet of claim 9 wherein the load member is a piston.

14. A valve comprising:
   a valve body having a flow passage and a bore adapted to receive a translatable valve member, the translatable valve member adapted to regulate a flow of a process fluid through the flow passage, the bore forming an auxiliary barrier fluid chamber;
   a first redundant sealing system sealingly interposed between the valve body and the translatable valve member;
   a second redundant sealing system sealingly interposed between the valve body and the translatable valve member, the second redundant sealing system in spaced relation to the first redundant sealing system, the first redundant sealing system and the second redundant sealing system spaced apart at least a maximum stroke length of the translatable valve member, the auxiliary barrier fluid chamber interposed between the first redundant sealing system and the second redundant sealing system, the auxiliary barrier fluid chamber being substantially free of barrier fluid during normal operation; and
   a barrier fluid indicator having a load member in a primary barrier fluid chamber containing a pressurizable barrier fluid, a first face of the load member exposed to the auxiliary barrier fluid chamber, a second face of the load member exposed to the barrier fluid and in fluid communication with the bore and the translatable valve member, a lower dynamic seal in the first redundant sealing system inhibiting fluid communication between the first face of the load member and the auxiliary barrier fluid chamber, the load member driven by a pressure of the auxiliary baffler fluid chamber to pressurize the barrier fluid.

15. The valve of claim 14 wherein the load member has a seal and a failure of the lower dynamic seal or a failure of the seal places the auxiliary barrier fluid chamber and the primary fluid chamber in fluid communication.

16. The valve of claim 14 wherein the load member has a seal and a malfunction of the lower dynamic seal or the seal causes a barrier fluid to occupy the auxiliary fluid chamber.

17. The valve of claim 14 wherein the auxiliary barrier fluid chamber has a bottom surface and a portion of the bottom surface is sloped.

18. The valve of claim 14 wherein the auxiliary fluid chamber and one or more dynamic seals within at least one of the first redundant sealing system and the second redundant sealing system prevents mixing of the barrier fluid and the process fluid.

19. The valve of claim 14 wherein the load member is a piston.

* * * * *